March 8, 1966  E. O. PONDER  3,238,782
INSTRUMENT
Filed June 1, 1962
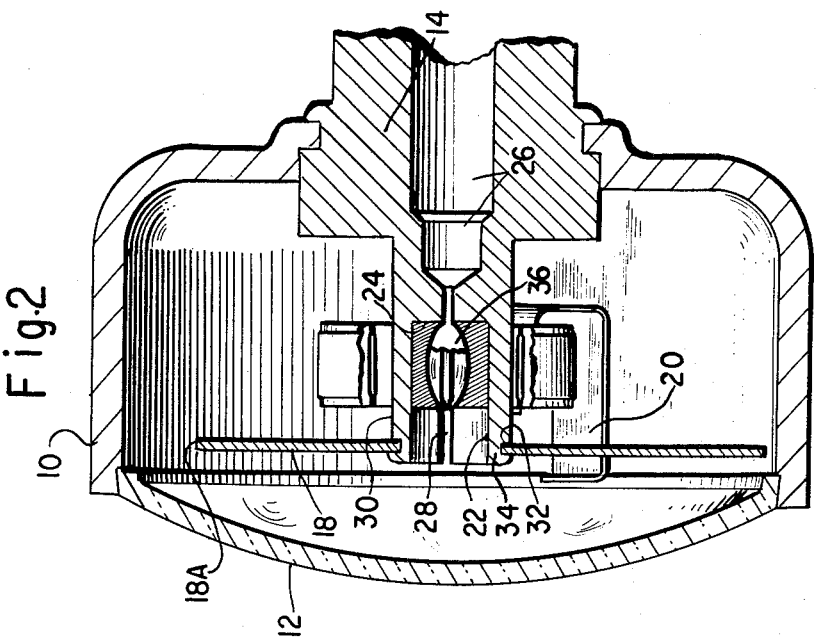
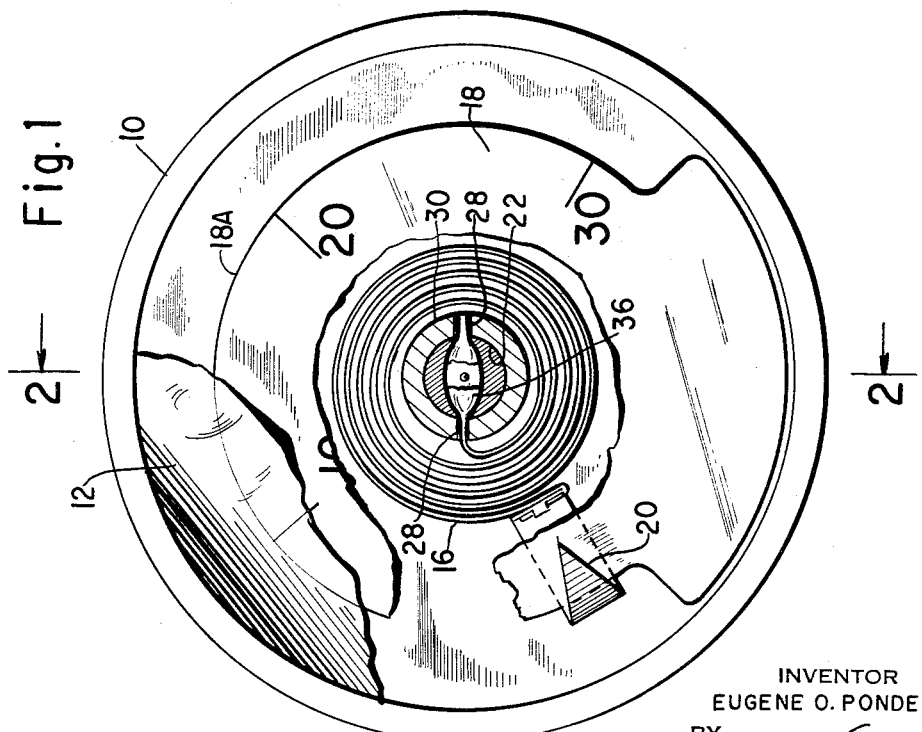
INVENTOR
EUGENE O. PONDER
BY
ATTORNEYS.

United States Patent Office 3,238,782
Patented Mar. 8, 1966

3,238,782
INSTRUMENT
Eugene O. Ponder, Doylestown, Pa., assignor to Ametek, Inc., New York, N.Y., a corporation of Delaware
Filed June 1, 1962, Ser. No. 199,394
4 Claims. (Cl. 73—418)

This invention relates to pressure gauges of the spring tube or Bourdon tube type, and more particularly to means for mounting a Bourdon tube within a gauge.

The invention may find particular application in pressure gauges for low-cost, light-weight fire extinguishers presently marketed for home, automobile and marine use. Such pressure gauges are utilized to give an indication of the pressure in an extinguisher so that the probable effectiveness of the extinguisher can be judged. The gauges should be small and inexpensive, while being reliably constructed so that an accurate determination of the extinguisher's condition may be made.

In pressure gauges of the Bourdon tube type, it may be difficult to meet the aforementioned requirements due to the fact that in mounting the Bourdon tube, an expensive and complicated procedure may be necessary to insure trouble-free operation of the tube. While it may be desirable to utilize inexpensive mounting means, such as soldering or the like, it may be found that utilization of such inexpensive means creates problems with regard to the dependability or simplicity of the mounting. Proper operation of the tube may be impaired and in order to overcome this, a complicated procedure or method for mounting the tube may be necessary. The present invention obviates the aforementioned difficulties due to the structural configuration thereof and the Bourdon tube mounting arrangement provided thereby.

One of the objects of the present invention is to provide a means for mounting a Bourdon tube within a pressure gauge in a reliabe, inexpensive and simple manner.

Another object of the invention is to provide means for mounting a Bourdon tube permitting utilization of a simple soldering operation without impairing reliable operation of the tube.

According to one aspect of the invention, the end of a Bourdon tube is formed with a bulged portion, and is affixed to a support post or socket within a pressure gauge. The post is slotted and has a recessed opening extending the depth of the slot. The bulged portion is positioned within the recessed opening with the Bourdon tube extending through the slot and around the support post. The assembly is then soldered by applying flux and solder to the opening in the support post. Other joining material, such as an adhesive or suitable plastic could be used.

In another aspect of the invention, the dial is spaced from the case, or has a slot therein, to receive the end of a pointer which is attached to the Bourdon tube. The pointer can extend under the dial and back over the same so as to cooperate with indicia thereon.

The foregoing and other objects, features and advantages of the invention will become apparent from the following description and drawing which are merely exemplary.

In the drawing:

FIG. 1 is a front view, with parts broken away, of a pressure gauge embodying the principles of the invention; and FIG. 2 is a sectional view, taken along the line 2—2, of the gauge shown in FIG. 1.

Referring to FIGS. 1 and 2, there is shown a pressure gauge having an outer casing 10 with a transparent viewing lens or window 12 affixed thereto in any suitable manner. A cylindrical support post or socket 14 extends interiorly of the casing 10 and has affixed thereto a Bourdon tube 16 and an indicating plate 18. The post 14 is formed with a step 32 and a circular lip 34 to facilitate the mounting of the plate 18 which fits tightly over the lip 34 in abutment with the step 32. A pointer 20 is attached to an end of the Bourdon tube 16 and is movable therewith relative to the indicating plate 18. The edge 18A may be spaced from the case so as to provide room for the end of pointer 20 to extend thereover.

The Bourdon tube 16 is a well known pressure-sensitive device, the operation of which is familiar to those skilled in the art. The interior of the Bourdon tube is exposed to a source of fluid pressure and as the level of this pressure varies, it effects a change in the curvature of the tube, thereby causing movement of pointer 20. The indicating plate 18, which is stationary, may be marked or graduated in any desired manner. As the pointer 20 moves relative thereto, there may be obtained a reading of the relative change of the pressure within the Bourdon tube.

The end of the Bourdon tube 16 opposite the end to which the pointer 20 is affixed is attached to post 14. The present invention is primarily directed toward a structural arrangement to effect attachment of the tube 16 to the post 14 by a simple, effectual soldering operation, and the principal features of this arrangement will now be described.

Cylindrical post 14 has cut therein an axially extending, recessed opening defined by the straight, cylindrical side walls 22 which terminate at a base surface 24. A smaller diameter opening defined by the straight, cylindrical side wall 26 extends to the exterior of the casing 10 and provides a fluid pressure flow inlet path. A pair of axially extending slots 28 are formed to provide an opening between side walls 22 and the exterior surface 30 of post 14. The slots 28 extend in the axial direction from the top (or left end, as viewed in FIG. 2) of post 14 to the base surface 24, thereby being equal in length to the depth of the opening defined by the side walls 22.

The centrally located end of Bourdon tube 16 has an enlarged portion or bulge 36 which is formed thereon by providing a convexity in the walls of the tube 16. The bulge 36 adapts the Bourdon tube to the soldering operation by which the tube is attached to post 14.

In assembling the component parts of the invention, the Bourdon tube 16 is positioned with the bulge 36 within the recessed opening defined by walls 22. The bulge 36 is placed against the base 24 with the tube 16 extending through the slot 28 and around the post 14. In this position, the bulge 36 abuts the edges at which the side walls 22 intersect slots 28 and thereby serves to partially close off the opening defined by walls 22 for a depth equal to the width of bulge 36.

With the component parts in position, the assembly is then soldered, for example, soft soldered, by heating and applying flux and solder to the recessed opening defined by the side walls 22. The solder which flows into the opening is prevented from flowing through the slots 28 due to the bulge 36 which closes off the slots 28. Thus, the soldering operation is effected without the flowing or creeping of solder between the sides of the Bourdon tube 16. If this were to occur, the adjacent sides of the tube 16 would become soldered together and the radial motion of the tube 16 would be restricted, thus rendering the tube ineffectual as a pressure gauge component. The structure of the present invention obviates the problems which may be encountered when mounting a Bourdon tube by means of a soldering operation, and consequently there is provided effectual means by which such a tube may be mounted in a simple and inexpensive manner. The bulge prevents solder from being transmitted across or through the interior of the tube such as by capillary action, as might happen if the bulge were not present.

Following the soldering operation, the interior of the Bourdon tube 16 is opened to the pressure source by drilling or piercing the walls of the tube 16. This may be accomplished by drilling an opening in the tube 16 at the bulge 36 so that a flow path is established through the opening defined by the cylindrical wall 26 to the interior of tube 16.

While in the foregoing there has been described a specific embodiment of the present invention, it should be understood that it is intended to cover all changes and modifications of the example of the invention herein chosen for the purposes of disclosure which do not constitute departures from the spirit and scope of the invention set forth in the appended claims.

What is claimed is:

1. In a pressure type gauge apparatus having a Bourdon tube to be mounted therein by soldering, the combination including a bulged portion formed adjacent one end of said tube and of greater thickness than the normal thickness of said tube, a support post within said pressure gauge apparatus for said tube, and having a recessed opening in the inner end thereof for positioning therein said bulged portion, said recessed opening being adapted to contain said soldering material to effect attachment of said Bourdon tube to said post, and slots in opposite sides of said recessed opening and coextensive with the depth thereof adapted to have the portions of said Bourdon tube adjacent said bulged portion extended therethrough.

2. In an apparatus having a Bourdon tube which is to be mounted by soldering, the combination including a bulged portion formed adjacent one end of said Bourdon tube and of greater thickness than the normal thickness of said tube, a support post for said tube and having a recessed opening in the inner end thereof for positioning therein said bulged portion, said recessed opening being adapted to contain said soldering material to effect attachment of said Bourdon tube to said support post, and slots in opposite sides of said recessed opening adapted to have portions of said Bourdon tube adjacent said bulged portion extend therethrough, said bulged portion being positioned within said recessed opening to prevent flow of said soldering material through said slotted means during soldering.

3. In a pressure gauge, the combination including a casing having a window at one side and an aperture through the other side, a post mounted in said aperture, said post having a passage therethrough, said passage being enlarged at one end to provide a recess, a slot across the inner end of said recess, Bourdon tube means having a bulged portion adjacent one end within said passage, said bulged portion being of greater thickness than the normal thickness of said tube, said tube having an aperture communicating with said passage to connect the interior of said Bourdon tube with said passage, dial means held on said post, and pointer means on the outer end of said Bourdon tube, said pointer means cooperating with said dial for providing an indication.

4. In a pressure gauge, the combination including a casing having a window at one side and an aperture through the other side, a post mounted in said aperture, said post having a passage therethrough, said passage being enlarged at one end to provide a recess, a slot across the inner end of said recess, Bourdon tube means extending into said slot and having a bulged portion adjacent one end within said passage, said bulged portion being of greater thickness than the normal thickness of said tube, said tube having an aperture communicating with said passage to connect the interior of said Bourdon tube with said passage, dial means held on said post, said dial means having a pointer-receiving clearance area therein, and pointer means mounted on said Bourdon tube, said pointer means having a portion extending through said clearance area and cooperating with said dial to provide an indication.

References Cited by the Examiner

UNITED STATES PATENTS

| 1,345,630 | 7/1920 | Place | 73—418 |
| 1,902,931 | 3/1933 | Zubaty | 73—418 |
| 2,299,542 | 10/1942 | Hedfield | 73—418 |
| 2,614,827 | 10/1952 | Peach et al. | |
| 2,948,060 | 8/1960 | Engleberger | 29—454 |
| 3,026,611 | 3/1962 | Du Bois | 29—454 |

LOUIS R. PRINCE, *Primary Examiner.*

ROBERT L. EVANS, RICHARD QUEISSER,
*Examiners.*